United States Patent [19]
Orthmann et al.

[11] Patent Number: 5,489,908
[45] Date of Patent: Feb. 6, 1996

[54] APPARATUS AND METHOD FOR IDENTIFYING MULTIPLE TRANSPONDERS

[75] Inventors: Kurt Orthmann, Munich; Andreas Hagl, Dachau, both of Germany

[73] Assignee: Texas Instruments Deutschland GmbH, Germany

[21] Appl. No.: 282,095

[22] Filed: Jul. 27, 1994

[51] Int. Cl.⁶ .................................................. G01S 13/75
[52] U.S. Cl. .......................... 342/42; 342/44; 340/825.54
[58] Field of Search ................................ 342/42, 44, 50, 342/51; 340/825.54

[56] References Cited

U.S. PATENT DOCUMENTS

| | | | |
|---|---|---|---|
| 4,333,072 | 6/1982 | Beigel | 340/825.54 |
| 5,041,826 | 8/1991 | Milheiser | 340/825.54 |
| 5,053,774 | 10/1991 | Schuermann et al. | 342/44 |
| 5,430,447 | 7/1995 | Meier | 342/51 |
| 5,438,335 | 8/1995 | Schuermann et al. | 342/51 |

FOREIGN PATENT DOCUMENTS 8802718  11/1988  Netherlands.

*Primary Examiner*—John B. Sotomayor
*Attorney, Agent, or Firm*—James C. Kesterson; Richard L. Donaldson; Rene E. Grossman

[57] ABSTRACT

Apparatus and method for identifying a plurality of transponders (10–16) located within an inquiry field (18) of an interrogation unit (20) are provided. Each transponder (10–16) is assigned an unique identification code, and the interrogation unit (20) dynamically constructs and modifies a bit string used to solicit responses from selected transponder(s) until each transponder (10–16) in the inquiry field (18) is identified. The bit string is transmitted to the transponders, which compares it with the least significant bits of their respective identification codes. A mismatch between the identification code and the bit string results in suppressing the response from the transponder.

22 Claims, 2 Drawing Sheets

APPARATUS AND METHOD FOR IDENTIFYING MULTIPLE TRANSPONDERS

TECHNICAL FIELD OF THE INVENTION

This invention relates in general to the field of transponder systems. More particularly, the present invention relates to apparatus and method for identifying multiple transponders located in close proximity to one another.

BACKGROUND OF THE INVENTION

Transponder arrangements have been used to detect and uniquely identify, in a contactless manner, objects, animals, or persons being present at selected locations. Transponder systems typically include an interrogation unit which transmits radio frequency pulses and a transponder unit which receives the pulses and responds with stored data in the form of a modulated radio frequency carrier. Because the transponders may be diminutive in size, transponder systems may be used in countless applications. For example, luggage being transported on a conveyor belt may be identified and routed according to the encoded destination at a routing point. Machine components may be identified and transported to specific stations on an assembly line. Movement and activity of animal stock with embedded transponder units may be monitored and recorded in an unobtrusive manner. Personnel may carry identification badges having a transponder unit to gain access to secured areas without having to use a card reader.

However, a problem arises when multiple transponders are simultaneously present within the inquiry field of an interrogation unit. If multiple transponder units exist in the inquiry field and responding simultaneously to the interrogation pulses of the interrogation unit, the responses may become garbled and unreadable. In particular, the resonant circuits of the transponders may interfere with the operation of other circuits so that no transponder response can be read.

Accordingly, a need has arisen for resolving the problem of detecting multiple transponders located in close proximity with one another in the inquiry field of an interrogation unit.

SUMMARY OF THE INVENTION

In accordance with the present invention, apparatus and method for identifying a plurality of transponders are provided which eliminates or substantially reduces the disadvantages associated with prior systems.

In one aspect of the invention, a method for identifying a plurality of transponders located within an inquiry field of an interrogation unit are provided. Each transponder is assigned an unique identification code, and the interrogation unit dynamically constructs and modifies a bit string used to solicit responses from selected transponder(s) until each transponder in the inquiry field is identified. The bit string is transmitted to the transponders, which compares it with the least significant bits of their respective identification codes. A mismatch between the identification code and the bit string results in suppressing the response from the transponder.

In another aspect of the invention, the method includes the steps of increasing the number of bits in the bit string by adding a bit of a predetermined logic value to a most significant bit position when more than one transponder responds to the transmitted bit string, inverting the logic value of a most significant bit after successfully identifying a transponder, and decreasing the number of bits in the bit string by deleting a bit from a least significant bit position when no more than one transponder responds to the transmitted bit string more than once successively.

In yet another aspect of the invention, the interrogation unit has a processor dynamically building and modifying a bit string, and a transmitter transmitting an interrogation pulse including the bit string receivable within an inquiry field. The transponders each include a memory storing an unique identification code, a resonant circuit receiving the interrogation pulse that contains the bit string, a controller comparing the received bit string with least significant bits of the stored identification code, and a de-energizer circuit suppressing the resonant circuit from transmitting a response in response to the least significant bits of the identification code being unequal to the bit string.

BRIEF DESCRIPTION OF THE DRAWINGS

For a better understanding of the present invention, reference may be made to the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

Figure 1:
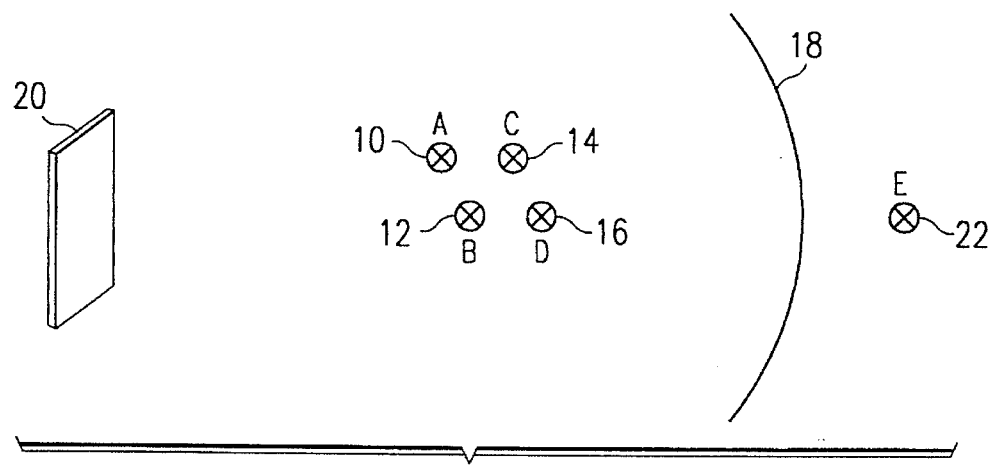
FIG. 1 is a simplified diagram showing multiple transponders located in an inquiry field of an interrogation unit.

FIG. 1 illustrates an exemplary scenario of multiple transponders 10–16, with identification codes A through D, being simultaneously present in an inquiry field 18 of an interrogation unit 20. Inquiry field 18 represents the area within which the interrogation or power pulses generated by interrogation unit 20 are readily receivable. Inquiry field 18 may contain a continuous modulated or unmodulated radio frequency signal. Transponders 10–16 are capable of receiving the interrogation pulses from interrogation unit 20 and respond thereto with stored data and their respective identification codes. As shown, a transponder 22 located outside of inquiry field 18 does not receive the interrogation pulse and therefore does not participate in transmission of its stored data.

In a typical transponder system, interrogation unit 20 sends an RF interrogation pulse. The interrogation pulse energizes a transponder located within the inquiry field, and enables it to respond with stored data. However in the scenario shown in FIG. 1, transponders 10–16 are located in close proximity to one another such that they interfere with one another's operations, and that the simultaneous responses from the transponders may not be readable by interrogation unit 20. As a result, the presence of transponders 10–16 are not properly detected.

Figure 2:
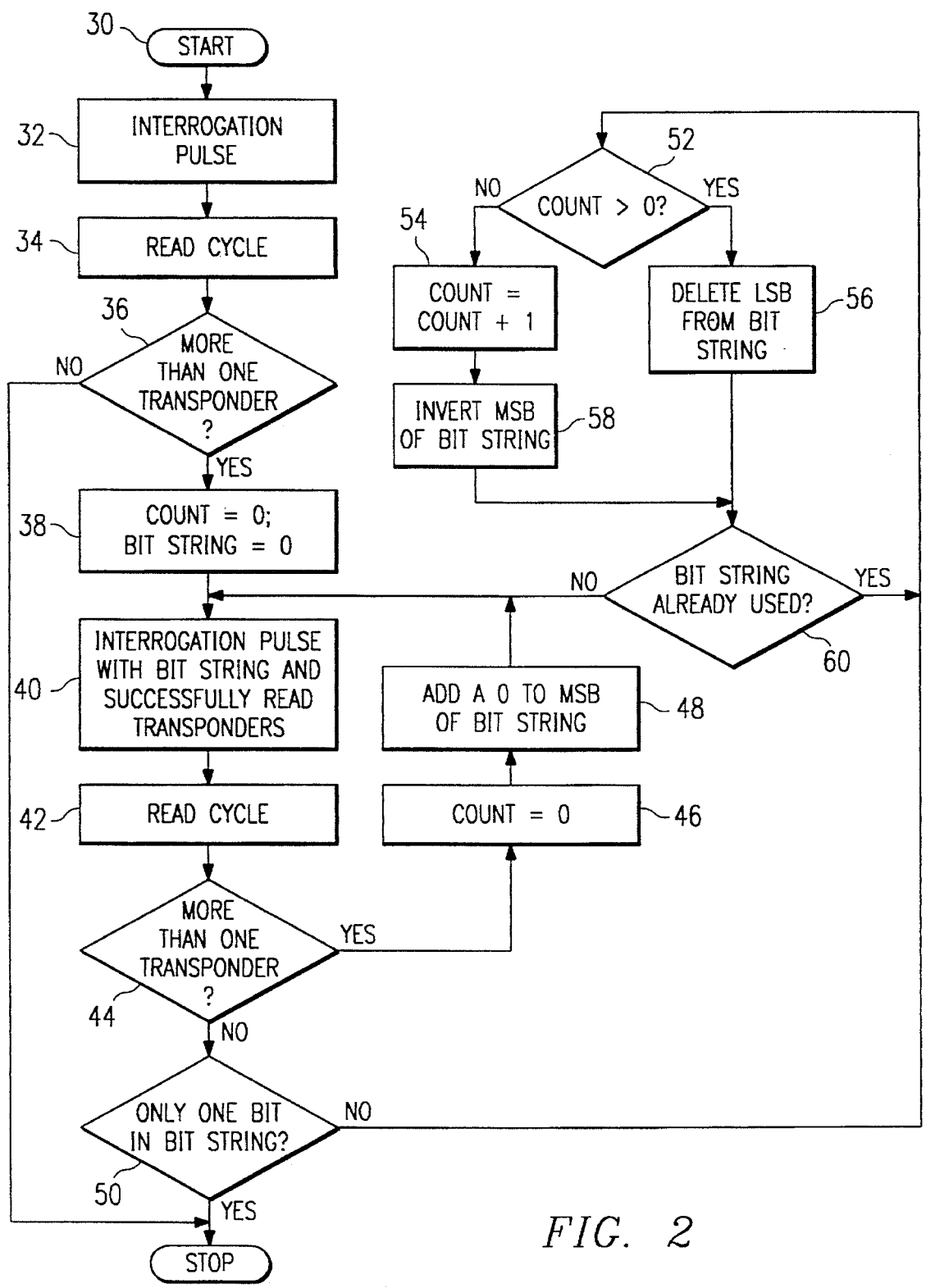
FIG. 2 is a simplified flowchart of the process of selectively reading the multiple transponders.

Referring to FIG. 2, a flowchart of the process in which a plurality of transponders located in an inquiry field are identified by dynamic selective addressing is shown. It may be advantageous to the understanding of the present invention to also refer to a specific example of transponder identification codes as the logic flow is described. The exemplary identification codes of the transponders are as follows, where "X" represents the most significant bits of the identification code:

| TRANSPONDER | ID |
|---|---|
| A | X0001 |
| B | X1000 |
| C | X0100 |
| D | X1100 |

At the start of the algorithm, interrogation unit 20 sends an interrogation pulse, as shown in blocks 30 and 32. A read cycle is then initiated to receive the responses from the transponders, as shown in block 34. If the responses are unrecognizable or unreadable, then a determination is made that more than one transponder are present in inquiry field 18, as shown in block 36. If there are more than one transponder present, then an initiation of a counter, COUNT, and a selection bit string is performed. As shown in block 38, COUNT is initialized to zero, and the selection bit string is initialized with a zero bit. The identification codes of the transponders may be uniquely assigned 64-bit bit strings where, in most applications, the transmission of a small number of the least significant bits is sufficient to uniquely identify the transponders. In block 40, interrogation unit 20 sends an interrogation pulse including the bit string and the identification bit string of any successfully read transponders. The identification code or bit string of successfully read transponders may be stored in a memory and deleted after a predetermined time period to enable the detection of a re-entry into the inquiry field. In addition, selection bit strings that have been transmitted in the selection procedure are also stored in memory and deleted after a predetermined amount of time.

Upon reception of the interrogation pulse with the bit string, each transponder 10–16 compares the bit string with the least significant bits of its own unique identification code In this case, since the bit string is "0", those transponders with identification codes ending in "0" respond to the interrogation pulse, and those transponders having identification codes ending in "1" do not respond. Therefore, transponder A with its identification code ending in "0001" is prevented from sending its reply, and transponders B through D send their responses and their identification codes. The read cycle of interrogation unit 20 once again tries to read the transponder responses, as shown in block 42. However, it discovers that there are more than one transponder present, as shown in block 44. In block 46, if the counter, COUNT, is not zero then it is reset. In block 48, a "0" is added to the most significant bit of the bit string to form "00". This new selection bit string is sent in the interrogation pulse, as shown in block 40, where the responses from transponders B through D again indicate multiple transponders with this identification code ending in "00", as shown in blocks 42 and 44. The bit string is again modified by adding another "0" to form "000". This time, the response to the interrogation pulse indicates only one transponder replied, since transponder B is the only transponder in this scenario to have the identification code ending in "000". Transponder B is therefore identified by the interrogation unit, and its identification code is stored in a memory.

The selection bit string must again be modified to progressively select the remaining transponders. Since it is determined, in block 44, that only one transponder responded to the "000" bit string, execution proceeds to block 50 where the bit string is examined to determine whether it is only one bit long. The bit string contains three bits presently, therefore execution proceeds to block 52. In blocks 52, the counter, COUNTER, is checked to determine whether it is greater than zero. If it is not, as in this case, then the counter is incremented by one in block 54, and execution proceeds to block 58, where the most significant bit of the bit string is inverted. The resultant bit string becomes "100". The new selection bit string is checked to determine whether it has been used previously. This bit string is then transmitted with the interrogation pulse. In addition, the identification code of the successfully read transponder, "000", is also sent to deselect transponder B. Note that although the format of the interrogation pulse is not explicitly described herein, it necessarily follows that some format is used in which the successfully read transponder identification codes may not be confused with the selection bit string.

In response to the selection bit string of "100", both transponders C and D respond, since both of their identification codes end with this bit string. The determination in block 44 is therefore answered in the affirmative, and the counter, COUNT, is reset in block 46. In block 48, a "0" is added to the selection bit string to form "0100". This new bit string is sent with the identification codes of successfully read transponders, resulting in suppressing responses from transponders A, B, and D, and the selection of transponder C. Transponder C is therefore detected and identified in block 42. In block 44, since only transponder C responded to the interrogation pulse, the bit string is examined to determine whether it is only one bit long. Since the answer is no, and COUNT is not greater than zero, COUNT is incremented, as shown in block 54. In block 58, the most significant bit of the selection bit string is inverted to form "1100". Since this new bit string has not been used previously, it is transmitted in an interrogation pulse resulting in the selection and identification of transponder D.

In block 44, since only transponder D responded to the interrogation pulse, execution proceeds to block 50, where it is determined that the bit string length is longer than one. In block 52, COUNT is checked to determined if it is greater than zero. Since it is, the least significant bit in the selection bit string is removed. The resultant selection bit string is "110". Because no transponder identification code has this bit string ending, no response is received, and the least significant bit of the bit string is removed again in block 56. The resultant bit string, "11" also does not solicit any response, causing the execution to go to block 50. Because the bit string is longer than one bit, and COUNT is still greater than zero, the least significant bit is again deleted to yield "1". When the selection bit string "1" is transmitted, transponder A responds since its least significant bit is "1". Therefore, transponder A is identified and read in block 42. In blocks 44 and 50, it is determined that there is not more than one transponder and the bit string length is only one bit long. Accordingly, execution stops. In this manner, all four transponders are identified and their respective data are read.

In summary, the selection bit string sequence generated by the procedure and the resultant transponder selection are as follows:

| | |
|---|---|
| 0 | - selecting B, C, and D |
| 00 | - selecting B, C, and D |
| 000 | - selecting B |
| 100 | - selecting C, and D |
| 0100 | - selecting C |
| 1100 | - selecting D |
| 110 | - selecting none |
| 11 | - selecting none |

-continued

| 1 | - selecting A |
|---|---|

Operating in this manner, a dynamically grown series of bit strings are used to exhaustively select and read the transponders present in the inquiry field. The transponders are deselected based on the bit string ending in their identification codes not matching those transmitted in the interrogation pulses. Alternatively stated, the transponders respond to the interrogation pulses only when their respective codes has the same bit string ending as those transmitted in the interrogation pulses. The bit strings are constructed and manipulated according to an algorithm which is capable of singling out all the transponders present in the inquiry field. Because the algorithm operates on bit strings, it accomplishes the task faster than one that selects and compares on a bit-by-bit basis. Furthermore, since the identification codes of successfully read transponders are also transmitted along with the selection bit string, a faster detection of yet undetected transponders is possible.

If transponders 10–16 are so close to each other as to cause a large shift in the resonance frequency of their transmissions, it may be necessary to determine the resonance frequency of the transponders. This may be performed by reckoning or measuring and comparing the change in length of the transponder responses due to the shift in resonance frequency to arrive at a new resonance frequency. The interrogation unit then transmits an interrogation pulse at the computed resonance frequency to achieve a full loading of all the transponders in the inquiry field and communication therewith.

Figure 3:
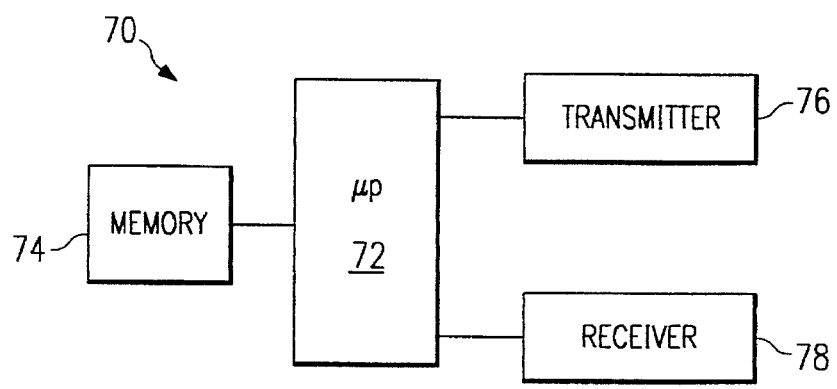
FIG. 3 is a simplified block diagram of an interrogation unit.

Referring to FIG. 3, a simplified block diagram of an embodiment of an interrogation unit 50 is shown. Interrogation unit 50 includes a microprocessor 52 which is responsible for the control of the function sequences. Microprocessor 50 is coupled to a memory 54, which may include the aforementioned queue used for storing the identification codes of recognized transponders. Further included are a transmitter 56 and receiver 58. Transmitter 56 and receiver 58 may include a radio frequency (RF) oscillator (not shown) and a resonant circuit (not shown). For a description of the construction and operation of an embodiment of the interrogation unit, please refer to U.S. Pat. No. 5,053,774, titled Transponder Arrangement, issued to Schuermann et al. on Oct. 1, 1991.

Figure 4:
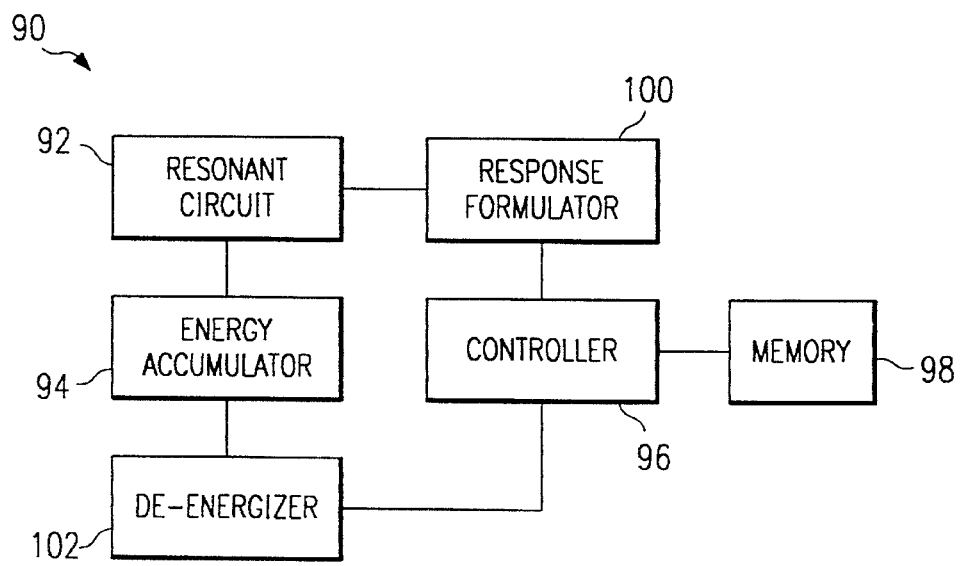
FIG. 4 is a simplified block diagram of a transponder.

FIG. 4 is a simplified block diagram of an embodiment of a transponder 70. Transponder 70 includes a resonant circuit 72 coupled to an energy accumulator 74. Resonant circuit 72 may include a receiving coil (not shown) coupled in parallel with a first capacitor (not shown). Energy accumulator 74 may include a second capacitor (not shown) coupled in series with resonant circuit 72. A controller 76 with memory 78 are also provided. Controller 76 may receive input signals from a sensor (not shown) indicative of certain physical parameters of the environment, for example ambient temperature and pressure, and store it in memory 78 for transmission to the interrogation unit. The unique identification code of the transponder also may be stored in memory 78. In addition, a response formulator 80 may read memory 78 to formulate the code pattern responses to the interrogation pulses. A de-energizer circuitry 82 controlled by controller 76 is further provided for shorting, discharging, or bypassing energy accumulator 74 in response to receiving an interrogation pulse containing the least significant bits of its identification code. De-energizer circuitry 82 therefore acts to suppress the transponder's response so that it may not respond to the interrogation pulse. Details of an embodiment of the transponder circuitry are described in above-identified U.S. Pat. No. 5,053,774, titled Transponder Arrangement.

Although the present invention and its advantages have been described in detail, it should be understood that various changes, substitutions and alterations can be made therein without departing from the spirit and scope of the invention as defined by the appended claims.

What is claimed is:

1. A method for identifying a plurality of transponders comprising the steps of:

assigning an unique identification code to each one of said plurality of transponders;

dynamically building and modifying a bit string and transmitting said bit string to said transponders;

permitting responses from those transponders having identification code endings equal to said transmitting bit string;

suppressing responses from those transponders having identification code endings different from said transmitted bit string;

repeating said bit string building, modifying and transmitting step and response permitting and suppressing step until only one transponder response is received and said transponder identified thereby; and repeating said bit string building, modifying and transmitting step and response permitting and suppressing step until all of said plurality of transponders are identified.

2. The method, as set forth in claim 1, wherein said bit string building and modifying step comprises the steps of:

increasing the number of bits in said bit string by adding a bit of a predetermined logic value to a most significant bit position when more than one transponder responds to said transmitted bit string;

inverting the logic value of a most significant bit after successfully identifying a transponder; and decreasing the number of bits in said bit string by deleting a bit from a least significant bit position when no more than one transponder responds to said transmitted bit string more than once successively.

3. The method, as set forth in claim 1, further comprising the step of transmitting a bit string ending of those successfully identified transponders, and suppressing said responses from those transponders having identification code endings equal to said transmitted bit string ending.

4. The method, as set forth in claim 1, further comprising the step of comparing said transmitted bit string and least significant bits of each of said transponder identification codes.

5. The method, as set forth in claim 1, further comprising the step of storing said identification codes of successfully identified transponders.

6. The method, as set forth in claim 5, further comprising the step of deleting said stored identification codes after a predetermined time period.

7. The method, as set forth in claim 1, further comprising the step of reckoning a shifted resonance frequency of said transponder responses.

8. The method, as set forth in claim 1, further comprising the step of storing said transmitted bit strings.

9. A method for identifying a plurality of transponders located in close proximity with one another within an inquiry field of an interrogation unit, comprising the steps of:

assigning an unique identification code to each of said plurality of transponders;

constructing a bit string;

transmitting said bit string in an interrogation pulse;

silencing those transponders having an identification code ending unequal to said bit string;

receiving responses to said interrogation pulse from those transponders having an identification code ending equal to said bit string;

modifying said bit string and transmitting said bit string until only one transponder responds and is identified; and repeating said modifying and transmitting bit string step until all of said plurality of transponders are identified.

10. The method, as set forth in claim 9, wherein said bit string constructing and modifying step comprises the step of adding a bit value to a predetermined bit position of said bit string after more than one transponder responds to said interrogation pulse.

11. The method, as set forth in claim 9, wherein said bit string constructing and modifying steps comprise the step of inverting the bit value of a predetermined bit position of said bit string after only one transponder responds to said interrogation pulse.

12. The method, as set forth in claim 9, wherein said bit string constructing and modifying steps comprise the step of deleting a bit value at a predetermined bit position in said bit string after only one transponder responds to said interrogation pulse more than once successively.

13. The method, as set forth in claim 9, wherein said bit string constructing and modifying steps comprise the steps of:

increasing the number of bits in said bit string by adding a bit of a predetermined logic value to a most significant bit position when more than one transponder responds to said interrogation pulse;

inverting the logic value of a most significant bit after successfully identifying a transponder; and decreasing the number of bits in said bit string by deleting a bit from a least significant bit position when no more than one transponder responds to said interrogation pulse more than once successively.

14. The method, as set forth in claim 9, further comprising the step of transmitting a bit string ending of those successfully identified transponders, and suppressing said responses from those transponders having identification code endings equal to said transmitted bit string ending.

15. The method, as set forth in claim 9, further comprising the step of comparing said transmitted bit string and least significant bits of each of said transponder identification codes.

16. The method, as set forth in claim 9, further comprising the step of storing said identification codes of successfully identified transponders.

17. The method, as set forth in claim 16, further comprising the step of deleting said stored identification codes after a predetermined time period.

18. The method, as set forth in claim 9, further comprising the step of reckoning a shifted resonance frequency of said transponder responses.

19. The method, as set forth in claim 9, further comprising the step of storing said transmitted bit strings.

20. A transponder system comprising:

an interrogation unit comprising:
 a processor dynamically building and modifying a bit string;
 a transmitter transmitting an interrogation pulse including said bit string receivable within an inquiry field; and a plurality of transponders located in close proximity with one another within said inquiry field, each transponder comprising:
 a memory storing an unique identification code;
 a resonant circuit receiving said interrogation pulse, said interrogation pulse including said bit string;
 a controller comparing said received bit string with least significant bits of said stored identification code; and
 a de-energizer circuit suppressing said resonant-circuit from transmitting a response in response to said least significant bits of said identification code being unequal to said bit string.

21. The system, as set forth in claim 20, wherein said transponder resonant circuit transmits a response in response to said least significant bits of said identification code being equal to said bit string.

22. The system, as set forth in claim 21, wherein said interrogation unit further comprises:

a receiver receiving said transponder response; and a memory storing bit strings eliciting response from only one transponder.

* * * * *